(12) United States Patent
Borkovic et al.

(10) Patent No.: US 11,509,185 B2
(45) Date of Patent: Nov. 22, 2022

(54) ELECTRICAL MACHINE

(71) Applicant: Mahle International GmbH, Stuttgart (DE)

(72) Inventors: Predrag Borkovic, Sempeter pri Gorici (SI); Vanja Pahor-Kos, Logatec (SI); Marko Pavsic, Dobrovo (SI); Ales Turel, Sempeter Pri Gorici (SI)

(73) Assignee: Mahle International GmbH

( * ) Notice: Subject to any disclaimer, the term of this patent is extended or adjusted under 35 U.S.C. 154(b) by 238 days.

(21) Appl. No.: 17/031,883

(22) Filed: Sep. 24, 2020

(65) Prior Publication Data

US 2021/0099045 A1  Apr. 1, 2021

(30) Foreign Application Priority Data

Sep. 26, 2019 (EP) ..................................... 19199895

(51) Int. Cl.
*H02K 5/14* (2006.01)
*H01R 39/08* (2006.01)
*H01R 39/38* (2006.01)

(52) U.S. Cl.
CPC ............. *H02K 5/141* (2013.01); *H01R 39/08* (2013.01); *H01R 39/38* (2013.01)

(58) Field of Classification Search
CPC .......... H02K 5/141; H02K 5/143; H02K 9/28; H01R 39/08; H01R 39/38; H01R 39/02; H01R 43/005
USPC ........................................................ 310/232
See application file for complete search history.

(56) References Cited

U.S. PATENT DOCUMENTS

| | | | | |
|---|---|---|---|---|
| 8,089,193 B2* | 1/2012 | Tanaka | ................... | H02K 5/141 310/239 |
| 2006/0175925 A1* | 8/2006 | Coles | ..................... | H02K 5/148 310/233 |
| 2006/0273685 A1* | 12/2006 | Wada | ..................... | H02K 5/141 310/239 |
| 2007/0188042 A1* | 8/2007 | Kaneda | ................. | H02K 5/141 310/239 |
| 2008/0030098 A1* | 2/2008 | Shawcross | ............. | H02K 5/148 310/239 |

(Continued)

FOREIGN PATENT DOCUMENTS

| | | |
|---|---|---|
| EP | 2319162 A1 | 5/2011 |
| WO | WO-10023190 A1 | 3/2010 |
| WO | WO-15/040823 A1 | 3/2015 |

*Primary Examiner* — Ahmed Elnakib
(74) *Attorney, Agent, or Firm* — Fishman Stewart PLLC

(57) ABSTRACT

The present disclosure describes an electrical machine. The Electrical machine includes a stator, a rotor, a winding fitted to the rotor, and an apparatus for supplying electrical energy to the winding. The apparatus includes a slip ring and a brush assembly including a brush holder and a brush. The slip ring and the brush assembly are arranged in a housing. An annular gap is disposed between the slip ring and the housing. The housing is fluidically substantially sealed in relation to an exterior, and a flow path of air is routed through the housing in a closed arrangement. The housing includes a housing part fluidically connected to the annular gap via a first flow opening and a second flow opening. A flow section of the flow path is routed through the housing part, and leads from the first flow opening to the second flow opening.

20 Claims, 4 Drawing Sheets

(56) References Cited

U.S. PATENT DOCUMENTS

| | | | | |
|---|---|---|---|---|
| 2008/0061652 | A1* | 3/2008 | Yamamuro | H02K 5/141 |
| | | | | 310/227 |
| 2011/0248599 | A1* | 10/2011 | Schurig | H01R 39/48 |
| | | | | 310/227 |
| 2011/0291505 | A1* | 12/2011 | Yamamoto | H02K 5/141 |
| | | | | 310/89 |

* cited by examiner

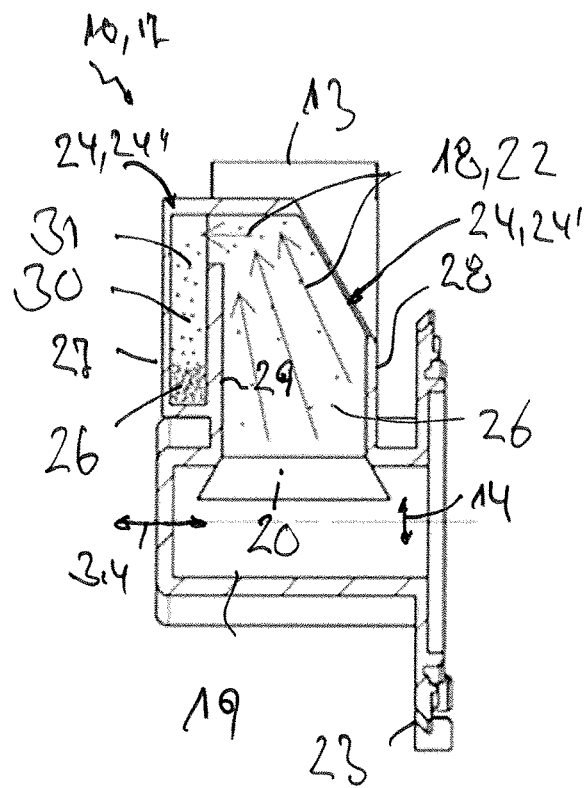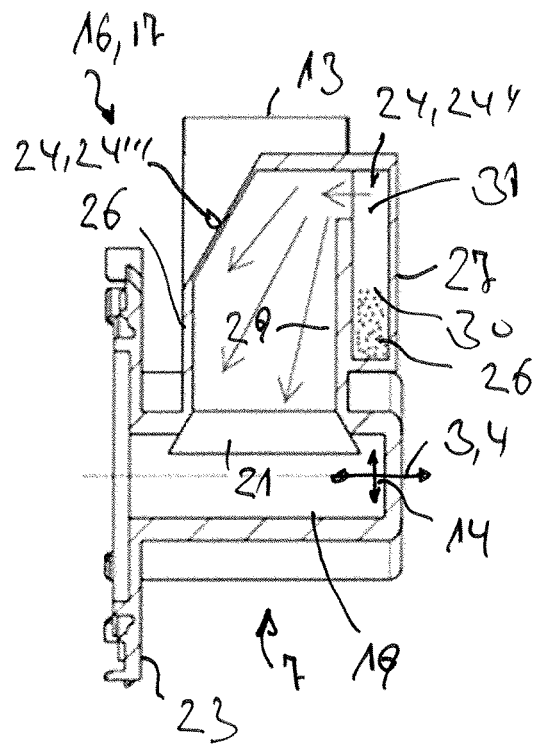
Fig. 5
Fig. 6
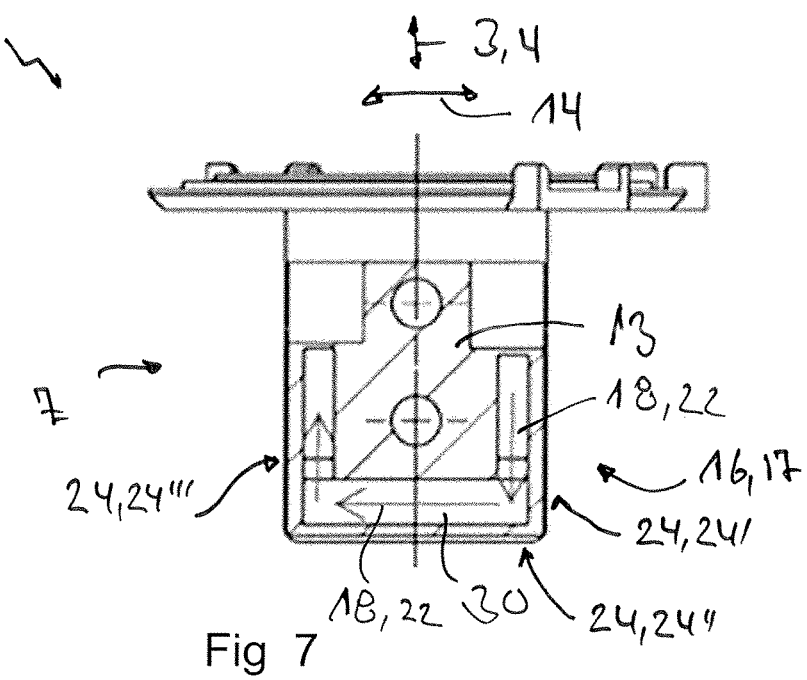
Fig 7

US 11,509,185 B2

ELECTRICAL MACHINE

CROSS-REFERENCE TO RELATED APPLICATION

This application claims priority to European Patent Application No. EP 19199895.4 filed on Sep. 26, 2019, the contents of which are hereby incorporated in its entirety.

TECHNICAL FIELD

The present invention relates to an electrical machine having a rotor, to which a winding is fitted for the generation of an electromagnetic field, wherein the winding is supplied with electricity by means of an apparatus which comprises a brush and a slip ring.

BACKGROUND

An electrical machine, for example an electric motor, comprises a rotor and a stator. A winding is fitted to the rotor which, in service, generates an electromagnetic field, such that the rotor rotates relative to the stator. For the supply of power to the winding which, in service, rotates with the rotor, electrical machines of this type are equipped with an apparatus comprising a slip ring, which is non-rotationally mounted on the rotor, and a brush assembly, wherein the brush assembly comprises a brush holder and a brush which is fitted to the brush holder. In service, the brush slide along the slip ring, and thus maintains electrical contact with the slip ring such that, in service, the winding can be supplied with electricity.

Dust is generated by the brush per se, and by the sliding of the brush on the slip ring, specifically by the action of friction. Dust results in increased wear within the electrical machine, and can accumulate in an annular gap constituted between the slip ring and a housing, thereby resulting in operational malfunctions of the electrical machine and the failure of the electrical machine.

From EP 2 319 162 A, in order to remove dust from the electrical machine, it is known to provide the electrical machine with a fan, by means of which an air flow is directed through the housing of the electrical machine, in which the apparatus is arranged. To this end, the fan extracts air from the surrounding environment, and directs the aspirated air along the slip ring and the brush, and thereafter out of the housing.

From US 2008/0061652 A1, it is known for a space to be provided in the housing of the electrical machine, below the rotor or the slip ring, in which the dust generated in service accumulates by gravity.

Known solutions from the prior art are disadvantageous, in that complex implementation is required for the removal of dust from the housing. Moreover, moisture and/or fluid from the surrounding environment can enter the housing of the electrical machine, thereby resulting in the failure of the electrical machine, or at least increased wear of the electrical machine. By the combination of fluid or moisture with the dust present, a slime-like mixture can form, which can result in substantial impairments to the operation of the electrical machine, increased wear, or even the failure of the electrical machine.

SUMMARY

The object of the present invention is therefore the disclosure, for an electrical machine of the type mentioned at the outset, of an improved or at least an alternative form of embodiment, which is specifically characterized by simplified implementation and/or by an increased service life.

According to the invention, this object is fulfilled by the subject matter of the independent claim(s). Advantageous embodiments are the subject matter of the dependent claims.

The present invention is based upon the general consideration whereby, in an electrical machine having a winding which is fitted to a rotor, a slip ring which is fitted to the rotor and a brush for the supply of electrical energy to the winding, a housing, in which the brush and the slip ring are arranged, is configured in a fluidically substantially sealed arrangement, such that a flow path of air is routed through the housing is in a closed arrangement within the housing, and the housing is provided with a housing part through which air is diverted, in order to remove dust from the air in the housing part. The closed configuration of the housing prevents any penetration of moisture or fluid from the surrounding environment into the housing, or at least reduces such penetration. The operational security of the electrical machine is improved in consequence. Moreover, the prevention or reduction of the penetration of moisture or fluid into the housing results in reduced abrasion of the electrical machine, and consequently prolongs the service life of the electrical machine. Moreover, by the removal of dust in the housing part which is separated from the slip ring, dust in the relevant region, namely between the brush and the slip ring, is removed or is at least reduced such that, in turn, the wear of the electrical machine is reduced and the service life is extended.

In the concept according to the invention, the electrical machine comprises the rotor, which cooperates with a stator of the electrical machine in a known manner. The winding is fitted to the rotor, specifically, the rotor carries the winding. In service, the winding generates an electromagnetic field and, to this end, requires an electric power supply which, at least partially, and preferably entirely, is delivered by means of an apparatus which, to this end, comprises the slip ring and the brush. The brush is a constituent element of a brush assembly of the apparatus which, additionally to the brush, also comprises a brush holder, which holds the brush in the housing. The slip ring is non-rotationally fitted to the rotor, and thus rotates with the rotor and, in consequence, also rotates with the winding. In service, the rotor rotates relative to the brush, wherein the brush slides on the slip ring and thus maintains electrical contact between the slip ring and the brush, for the supply of electric power to the winding. Specifically, it is conceivable for the brush to be secured in the housing by means of the brush holder whereas, conversely, the rotor in the housing is rotatable relative to the housing, and specifically is rotatably mounted. In order to permit the rotation of the slip ring relative to the housing, the housing is radially spaced from the slip ring and, in the region of the slip ring, extends in a circumferential direction, assuming, for example, a basic hollow cylindrical form. As a result of the radially spaced arrangement of the housing and the extension thereof in the circumferential direction, an annular gap is constituted between the slip ring and the housing, in which the slip ring rotates with the rotor, in service. According to the invention, the housing is fluidically sealed vis-à-vis the exterior, wherein a flow path of air is routed through the housing in a closed arrangement. The housing comprises the housing part, which is arranged in the region of the annular gap. The housing part is fluidically connected to the annular gap via two flow openings. The two flow openings, also described hereinafter as the first flow opening and the second flow opening, respectively terminate in the annular gap, wherein they are mutually spaced from one another in the circumferential direction. The closed flow path in the housing is routed through the housing part, wherein a flow section of the flow path which is routed through the housing part is delimited by said housing part, and leads from the first flow opening to the second flow opening.

By means of the housing part and the flow section, air is diverted from the annular gap and through the housing part, in which dust is at least partially removed from the air such that the air, upon the return flow thereof to the annular gap, contains a reduced proportion of dust.

The fluidically substantially sealed configuration of the housing in the present case means that the housing is preferably fluidically sealed vis-à-vis the exterior and specifically comprises no outwardly-communicating openings or similar. Alternatively the housing might comprise at least one outwardly-communicating opening, which opening, however, does not lead to a flow of fluid into the housing.

In the present case, directional indications refer to the axial extension of the rotor which, appropriately, also corresponds to the axis of rotation of the rotor, the slip ring and the winding. Correspondingly, the radial direction is also to be understood as perpendicular to the axial direction and "in the circumferential direction" is correspondingly in relation to the axial extension, i.e. enclosing the rotor and/or the slip ring.

The annular gap preferably extends axially beyond the slip ring, such the rotor is also spaced in relation to the housing by means of the annular gap. In other words, the rotor is also at least partially arranged in the housing, and is spaced from the housing by the annular gap.

The annular gap, in the region of the slip ring, and at an axial spacing from the slip ring, assumes different radial extensions.

The annular gap is appropriately a hollow gap, in which the slip ring and/or the rotor can rotate freely. The annular gap is thus air-filled.

Naturally, in the air gap and within the housing, not only air, but any other preferred gas or gas mixture can be introduced. Hereinafter, air is to be understood as air per se, and also as other gases or gas mixtures. In the present case, air is thus synonymous with gas or a combination of gases.

In preferred embodiments, it is provided that the housing part, through which the flow section is routed, accommodates the brush assembly, specifically the brush holder. Advantageously, the brush projects radially from the housing into the annular gap such that, in service, it slides on the slip ring. In this manner, it is possible to additionally employ the housing part to receive the brush assembly, specifically to accommodate the brush holder and/or to additionally employ an existing housing part which accommodates the brush assembly, specifically the brush holder, for the routing of the flow path, and thus for the removal of dust. Overall, this results in a considerable simplification of the design of the electrical machine, with reduced weight and/or spatial requirements.

Embodiments have proved to be advantageous, in which the brush extends in the circumferential direction between the first flow opening and the second flow opening. This means that the brush, specifically at the end thereof which faces the slip ring, extends between the first flow opening and the second flow opening. It is specifically preferred if the brush extends in the circumferential direction from the first flow opening to the second flow opening. In other words, the brush extends between the two flow openings, and is specifically routed from one flow opening to the other flow opening. As a result, any dust generated by the brush can enter the housing part in a simple manner, and can thus be removed more effectively.

Embodiments are advantageous in which the annular gap between the slip ring and the housing is dimensioned such that, during the operation of the rotor, the rotation of the slip ring which is non-rotationally mounted on the rotor generates a pressure difference in the air between two regions which are spaced in the circumferential direction, which pressure difference drives the air along the flow path. Preferably, the annular gap and the slip ring are configured such that the in-service rotation of the slip ring generates a pressure difference between the first flow opening and the second flow opening, which pressure difference drives the air along the flow path. To this end, the so-called "wall effect", also known as "near wall effect", is employed, wherein the air in the vicinity of the slip ring is entrained by the slip ring, by the action of friction, such that, in the rotational direction of the slip ring, in the region of one of the flow openings, the air is entrained and, in the region of the other flow opening, the air is pushed in. If the rotational direction of the slip ring is such that said direction is routed from the first flow opening to the second flow opening, a lower pressure prevails in the region of the second flow opening than in the region of the first flow opening, and vice versa The rotation speed for generating said difference in pressure in order to drive the air along the flow path is preferably 2500 rounds per minute (RPM) and more, more preferably 3000 RPM and more with the difference in pressure and thus the flow speed increasing with increased rotation speed.

Embodiments have proven to be advantageous, in which the radial dimension of the annular gap is between 0.2 mm and 2.0 mm, preferably between 0.5 mm and 1.5 mm, more preferably between 0.9 mm and 1.1 mm, in particular 1.0 mm. These radial dimensions of the annular gap lead to an optimum between said pressure difference and a sufficient air flow. This is because with decreasing radial dimension of the annular gap the pressure difference increases while the air flow decreases and vice versa. In these cases the electrical machine is preferably configured in a manner to rotate with a rotation speed of 3000 RPM or more.

Accordingly, the rotation of the rotor per se, which occurs in service in any event, and the associated rotation of the slip ring are therefore employed for the propulsion of air within the housing, such that said air, by the action of this rotation, flows along the closed flow path in the housing. Specifically, it is thus possible to omit further conveyor devices such as, for example, ventilators, pumps or similar, for the propulsion of air in the housing. The electrical apparatus can thus be free of separate conveyor devices for the propulsion of air. This considerably simplifies the design and operation of the electrical machine. Moreover, the electrical machine can thus be operated in a more energy-efficient manner. In this way, it is also possible for the externally fluid-tight configuration of the housing to be implemented in a particularly efficient manner. It is thus also possible for the electrical machine to be employed in humid and/or wet environments.

Embodiments are preferred in which the housing part is comprised of at least two sections, also described hereinafter as housing part sections, each of which delimits the flow section in the housing part, wherein at least two of the successive flow sections are inclined or transversely oriented in relation to one another. As a result, in the transition region between these housing part sections, the air in the transition region collides, such that said transition region constitutes an impact wall. As a result of the impact wall, upon impact, dust which is entrained in the air remains on the impact wall, and is thus removed from the air. By the routing of the flow path in the housing part, it is thus possible for dust to be simply and efficiently removed from the air.

Embodiments are preferred in which the housing part comprises an outer wall and an inner wall arranged in opposition to said outer wall, which respectively delimit the flow section. Moreover, between the outer wall and the inner wall, an intermediate wall is arranged which, in combination with the outer wall, constitutes a chamber. The chamber, at one open side, which is remote from at least one of the flow openings, preferably from the respective flow opening, is fluidically connected to the flow section. Thus, firstly in the region of the impact walls, and secondly in the region of the inner wall and outer wall and the intermediate wall, dust contained in air or precipitated dust flows into the chamber, where it is retained. The otherwise closed configuration of the chamber prevents any flow-related escape of dust from the housing part. The chamber thus constitutes a repository for dust, which permits the reliable removal of dust from air and the retention thereof.

In principle, the housing part can assume any preferred arrangement or orientation relative to the housing.

Embodiments are preferred in which the housing part projects radially from the housing. This permits, firstly, a simplified and advantageous routing of the flow path through the housing part, thereby permitting an advantageous profile of the flow section. Secondly it is possible, in this manner, in the arrangement or accommodation of the brush assembly, specifically the brush holder, in the housing part, to achieve an advantageous arrangement of the brush relative to the slip ring.

In principle, the flow section can assume any preferred profile within the housing.

Embodiments are preferred in which the flow section assumes a symmetrical profile within the housing. Specifically, this permits the simple and reliable removal of dust from the air in both directions of rotation of the rotor, and thus of the slip ring. Specifically, it is thus possible to additionally achieve the above-mentioned pressure difference between the two flow openings, in both directions of rotation of the slip ring. The symmetrical profile of the flow section is advantageously achieved by a correspondingly symmetrical configuration of the housing part and/or a correspondingly symmetrical arrangement of the flow openings. Advantageously, the housing part symmetrically delimits the flow section with respect to a plane which is oriented radially through the housing part and, advantageously, in the circumferential direction, is centrally and radially oriented through the housing part.

Embodiments have proved to be advantageous in which the electrical machine incorporates collection spaces, which are configured as cut-outs in the housing which are fluidically connected to the annular gap. In the collection spaces, during operation, dust which is contained in the air is removed and collected. In principle, collection spaces of this type can also be employed independently of the housing part. It is thus conceivable for such collection spaces to be provided, alternatively to the housing part or additionally to the housing part.

The collection space is specifically provided in combination with the above-mentioned pressure difference, i.e. in particular where the electrical machine is provided free of separate conveyor devices for the propulsion of air.

The respective collection space is fluidically connected to the annular gap. At least one of the collection spaces extends along the flow path in the region of the collection space, and is spaced from the annular gap. The influx of air into the collection space is thus facilitated in a simple manner, and dust can be removed from the air. Accordingly, if the collection space is arranged in the region of the annular gap, the collection space advantageously extends in the circumferential direction.

It is preferred in this case if the housing, in the region of the annular gap, incorporates at least one such collection space.

If at least one of the collection spaces is configured in the housing part, the fluidic connection of the collection space with the annular gap is achieved by means of at least one of the flow openings.

If at least one of the collection spaces is arranged in direct proximity to the annular gap, fluidic connection with the annular gap is achieved by means of an open configuration of the collection space on at least one end of said collection space, arranged in the circumferential direction.

Advantageously, the housing, for at least one of the at least one collection spaces, comprises a projection which projects into the collection space. The projection can be configured in the form of a rib. By means of the projection, an impact surface is constituted when air flows through the collection space. At the same time, the projection prevents any re-entry of dust into the annular gap.

The improved removal of dust from air can also be achieved, wherein the cross section of at least one of the at least one collection spaces varies along the flow path, specifically in the circumferential direction. It is preferred if the cross section of the collection space tapers in the direction of flow, specifically in the circumferential direction.

In principle, the housing can incorporate only one such collection space. Preferably, the housing comprises at least two such collection spaces. This permits the more effective local removal of dust from air and/or the provision of an enlarged overall volume for the collection of dust.

Advantageously, at least two of the collection spaces are arranged in sequence along the flow path, specifically in the circumferential direction.

In principle, if at least two such collection spaces are provided, these can be differently configured, and can specifically assume a different shape and/or size. It is also conceivable that at least two such collection spaces are configured identically.

If two collection spaces are provided in sequence along the flow path, specifically in the circumferential direction, it is conceivable for these to be fluidically interconnected outside the annular gap wherein, in this case, the two interconnected collection spaces are preferably differently configured. It is thus possible, upon the influx of air into the collection space, to constitute a plurality of impact surfaces and repositories for dust, thereby improving the removal of dust from the air.

In preferred embodiments, at least one of the collection spaces extends axially along the slip ring. In particular, the collection space is axially in coverage with the slip ring. This leads to an enhanced collection of dust within the collection space. Moreover, the volume of the collection space is increased and more dust can be collected.

It is understood that the electrical machine can also comprise two or more slip rings, wherein the slip rings cooperate with respectively separate brushes in the brush assembly. It is likewise possible that at least two of the at least two slip rings cooperate with one such common brush.

If at least two brushes are provided, it is conceivable that, for the respective brush, an associated first flow opening and/or an associated second flow opening are provided. It is also conceivable that, even in the presence of two or more brushes, only one first flow opening and one second flow opening are provided.

Further important characteristics and advantages of the invention proceed from the sub-claims, from the drawings, and from the associated description of the figures, with reference to the drawings.

It is understood that the above-mentioned characteristics, and those to be described hereinafter, are not only applicable in the respective combination indicated, but also in other combinations or in isolation, without departing from the scope of the present invention.

Preferred exemplary embodiments of the invention are represented in the drawings, and are described in greater detail in the following description, wherein the same reference numbers refer to identical, similar or functionally equivalent components.

BRIEF DESCRIPTION OF THE DRAWINGS

In the drawings, schematically in each case,

FIG. 5 shows a sectional view through the plane designated in FIG. 3 by B-B, FIG. 6 shows a sectional view through the plane designated in FIG. 3 by C-C, FIG. 7 shows a sectional view through the plane designated in FIG. 3 by A-A.

DETAILED DESCRIPTION

Figure 1:
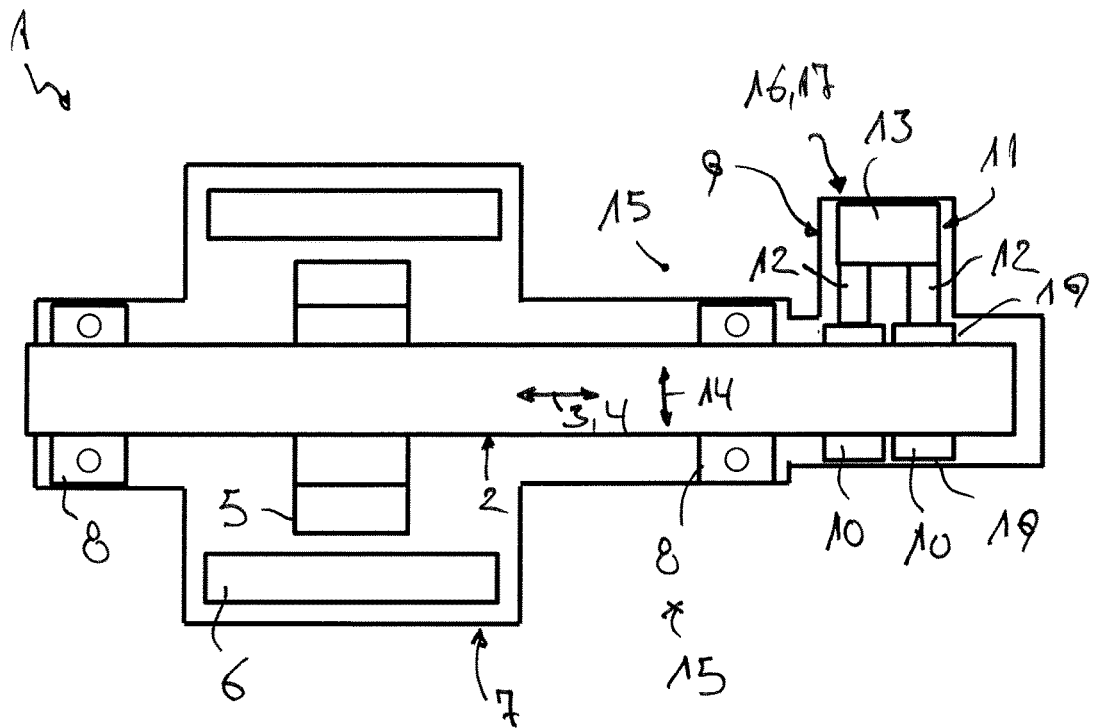
FIG. 1 shows a highly simplified sectional view of an electrical machine having a housing, which comprises a housing part.

An electrical machine 1, as shown, for example, in FIG. 1 in a highly simplified sectional view, comprises a rotor 2, which extends in an axial direction 3, which simultaneously defines an axis of rotation 4 of the rotor 2. On the rotor 2, a winding 5 is non-rotationally mounted, by means of which, in service, an electromagnetic field is generated which cooperates with a stator 6. The electrical machine 1 comprises a housing 7, in which the rotor 2 is rotatably mounted, for example by means of bearings 8, about the axis of rotation 4. In the housing 7, in addition to the shaft 2, the stator 6 and the winding 5 are also arranged. On one side, the rotor 2 projects axially out of the housing 7, so that rotational energy can be applied to the rotor from an external energy source or taken from the rotor. The housing 7 is fluidically sealed vis-à-vis the exterior, and specifically comprises no outwardly-communicating openings or similar. In the region in which the rotor 2 projects out of the housing 7, for example, an unrepresented seal can be provided.

For the generation of the electromagnetic field, the winding 5 requires an electric power supply, which is delivered by means of an apparatus 9. The apparatus 9 comprises a slip ring 10, which is non-rotationally mounted on the rotor 2, and a brush assembly 11, which comprises a brush 12 and a brush holder 13, which contains the brush 12. In the example represented, two such slip rings 10 are provided and spaced from one another in the axial direction 3. A dedicated brush 12 is assigned to each slip ring 10, such that the brush assembly 11 represented comprises two brushes 12, which are axially spaced from one another. Both brushes 12 are held with a common brush holder 13. Via the brush holder 13, in the example represented, an electrical connection is also constituted between the brushes 12 and an external, unrepresented energy source. The brushes 12 are respectively arranged in a radial direction 14 which is oriented transversely to the axial direction 3, and are thus radially spaced in relation to the rotor 2, and extend in a circumferential direction 15 vis-à-vis the axial direction 3 over a segment of the entire circumference of the slip rings 10. In service, i.e. during the rotation of the rotor 2, the slip rings 10 rotate with the rotor 2, and thus also relative to the brushes 12 which, with the brush holder 13, are fixed relative to the housing 7. In service, the respective brush 12 slides on the associated slip ring 10, and thus maintains an electrical contact with the associated slip ring 10. Electricity is thus supplied from or to the winding 5, even during operation. The housing 7 comprises a housing part 16 in which, in the example represented, the brush assembly 11, specifically the brush holder 13, is accommodated. The housing part 16 can thus also be described as a brush housing 17.

Figure 2:
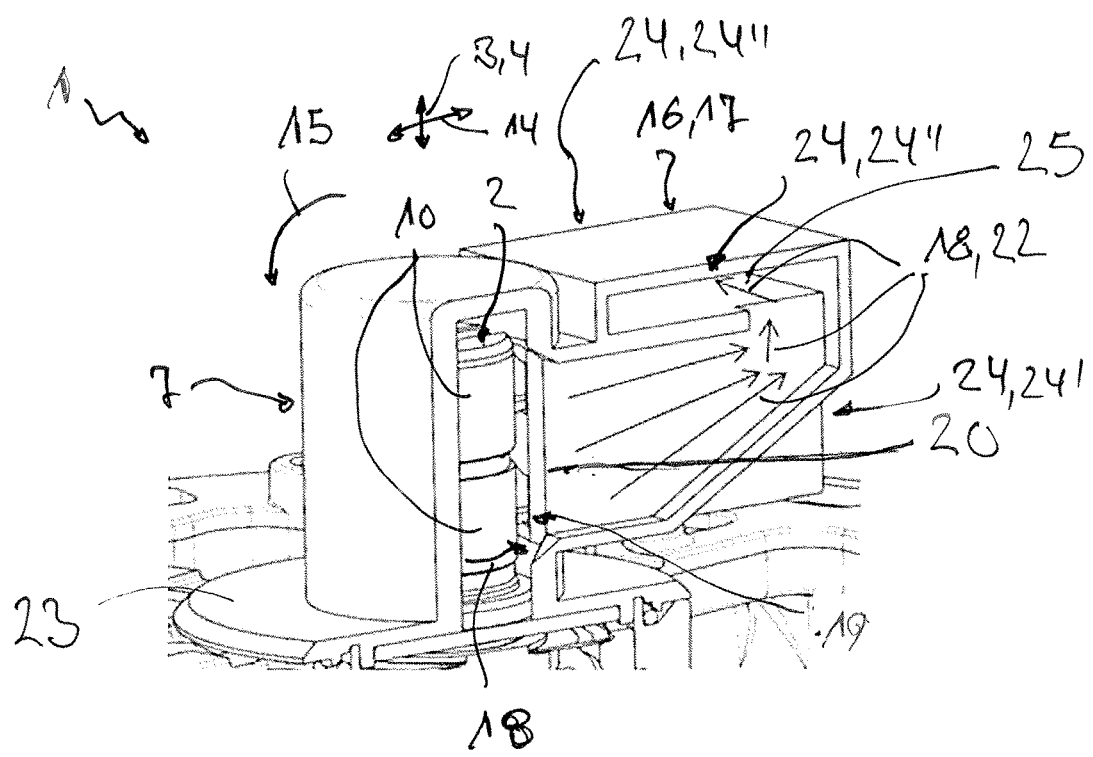
FIG. 2 shows an isometric, partially sectional view of the electrical machine, in the region of the housing part.
Figure 3:
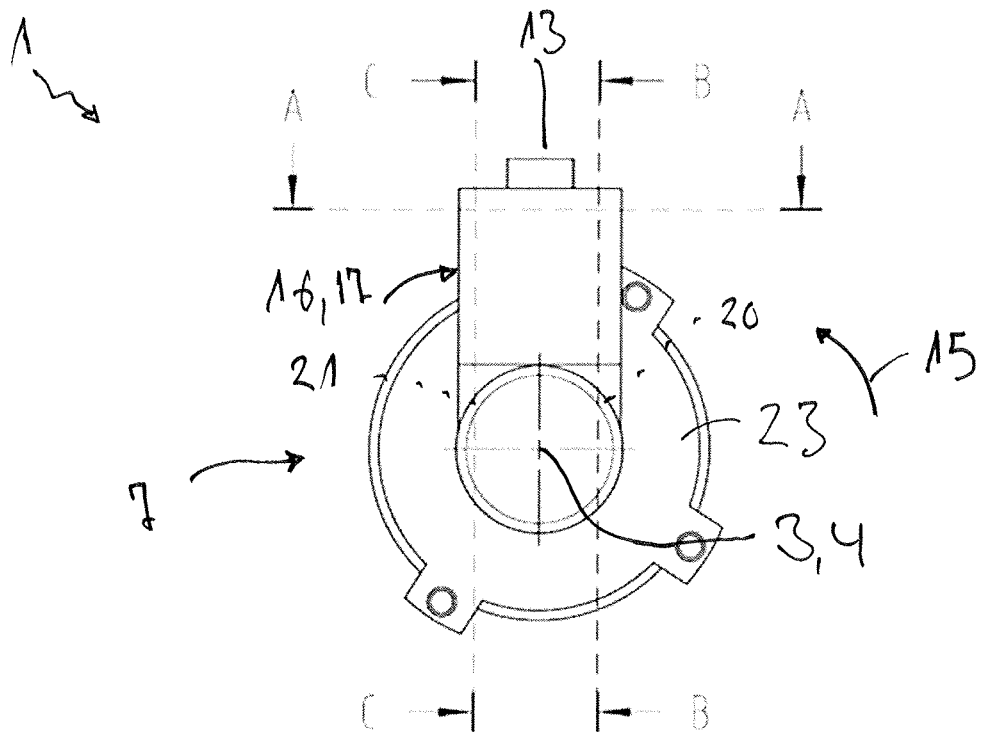
FIG. 3 shows an axial overhead view of the electrical machine, in another exemplary embodiment.
Figure 4:
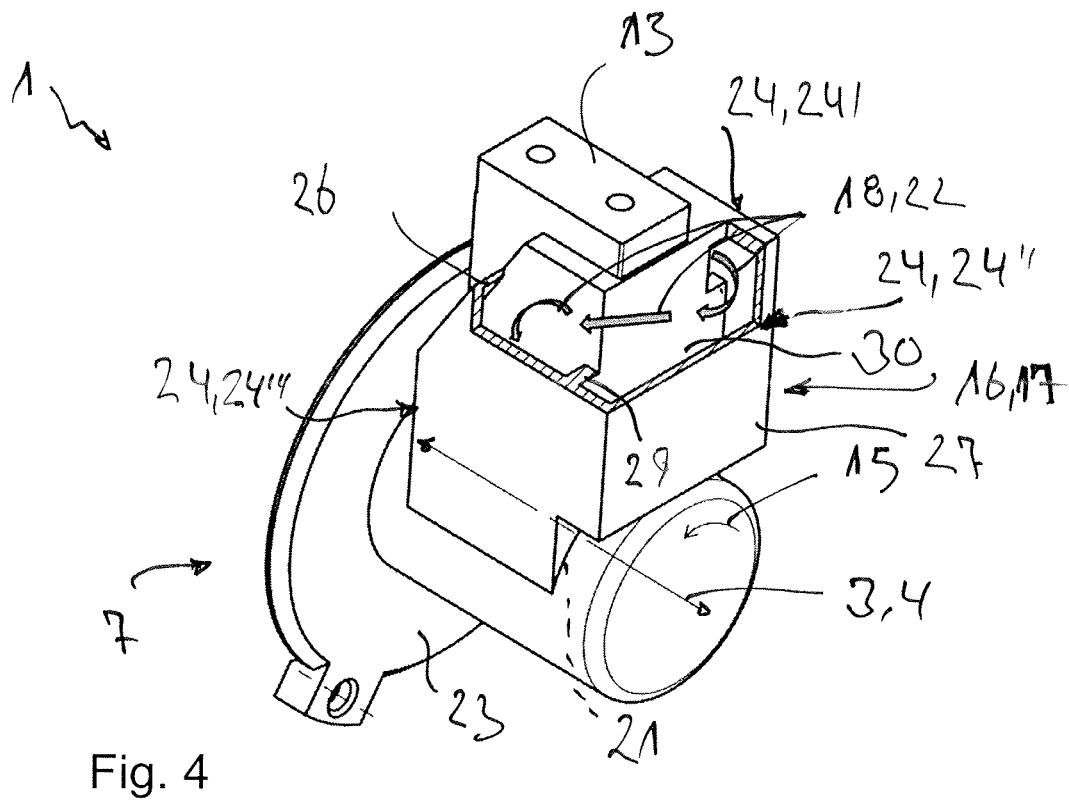
FIG. 4 shows an isometric, partially sectional view of the electrical machine from FIG. 3, in the region of the housing part.

FIGS. 2 to 7 show different views of the electrical machine 1, wherein FIG. 2 shows a partial sectional isometric view of the electrical machine 1. FIGS. 3 to 7 show a further exemplary embodiment of the electrical machine 1. FIG. 3 shows an overhead view, FIG. 4 shows an isometric, partially sectional view, FIG. 5 shows a section through the plane designated in FIG. 3 by B-B, FIG. 6 shows a section through the plane designated in FIG. 3 C-C, and FIG. 7 shows a section through the plane designated in FIG. 3 by A-A. In the interests of clearer understanding, the brushes 12 in FIGS. 2 to 7 and the slip rings 10 in FIGS. 5 to 7 are not represented. These exemplary embodiments are described in combination hereinafter, wherein any differences are addressed separately.

The fluidically closed configuration of the housing 7 is such that a closed flow path 18 of air, specifically indicated by arrows in FIG. 2 and in FIGS. 4 to 7, is routed in the housing 7, and air thus circulates in the housing 7.

The housing 7, in the region of the apparatus 9, specifically the slip rings 10, is spaced from the slip rings 10, and extends in this region in a closed arrangement, in a circumferential direction 15. Accordingly, an annular gap 19 extending in the circumferential direction 15 is constituted between the slip rings 10 and the housing 7. In radial proximity to the annular gap 19, the housing part 16 projects radially away from the housing 7. The housing part 16, via a first flow opening 20 which is visible for example in FIG. 2 and via a second flow opening 21 which is visible for example in FIG. 6, is fluidically connected to the annular gap 19 in each case. The respective flow opening 20, 21 thus opens directly into the annular gap 19. An overview of FIGS. 2 to 7 further indicates that the flow path 18 runs via the flow openings 20, 21 through the housing part 16, such that a flow section 22 of the flow path 18 is routed via both flow openings 20, 21 through the housing part 16.

In the examples represented, the housing 7, by way of a plate-shaped section 23 adjoining the bearing 8 which is axially closest to the slip rings 10, which projects radially and is closed in the circumferential direction 15, also described hereinafter as a plate section 23, is essentially isolated from the remaining volume of the housing 7, such that flow path 18 is essentially routed in a closed arrangement in the region of the annular gap 19, and through the housing part 16.

The housing part 16 delimits the flow section 22 of the flow path 18. As indicated by an overview of FIGS. 2 to 7, the housing part 16, along the flow section 22, comprises a plurality of successive housing part sections 24 which delimit the flow section 22, wherein successive housing part sections 24 along the flow section 22 are transversely oriented or inclined in relation to one another. In the examples represented, a first housing part section 24' extends radially, wherein a flow cross-section of this first housing part section 24' tapers at with increasing radial distance from the first flow opening 20. In FIG. 2, the housing 7 is represented in section in the region of the first housing part section 24'. The first housing part section 24' is succeeded by a second housing part section 24". The second housing part section 24" is oriented transversely to the first housing part section 24' and terminates in a third housing part section 24"', which is arranged opposite the first housing part section 24'.

The third housing part section 24' assumes a parallel, and thus radial orientation to the first housing part section 24'. In FIG. 4, the housing part 16, in the region of the second housing part section 24" and the third housing part section 24"', is represented in section. As can specifically be seen from FIG. 4, the housing part sections 24 thus enclose the brush holder 13. All the housing part sections 24 are configured in mirror symmetry to an unrepresented centrally and radially extending plane through the housing part 16, such that the flow section 22 is symmetrical with respect to this plane. From FIGS. 2 to 7, it can further be seen that the flow openings 20, 21 are mutually spaced in the circumferential direction 15. The flow openings 20, 21 are thus also arranged and configured in mirror symmetry to the abovementioned plane. The brushes 10 extend in the circumferential direction 15 between the first flow opening 20 and the second flow opening 21, preferably from the first flow opening 20 to the second flow opening 21.

As a result of the housing part sections 24, the flow section 22 undergoes a number of diversions within the housing part 16 such that, specifically in the transition region between the successive housing part sections 24, at least one impact wall 25 is constituted in each case.

In the operation of the electrical machine 1, dust is produced, specifically by the action of friction between the respective brush 12 and the associated slip ring 10, which is entrained by air flowing through the housing 7, specifically through the housing part 16. The dust is thus combined with the diverted flow of air through the housing part 16 and collides with the impact wall 25. As represented, for example, in FIGS. 5 and 6, dust 26 is thus removed from the air.

In the exemplary embodiments represented in FIGS. 2 to 7, it can be seen that the housing part 16 comprises a radially extending outer wall 27 and a radially extending inner wall 28, which respectively delimit the flow section 22.

In the exemplary embodiment represented in FIGS. 3 to 7, an intermediate wall 29 is further arranged between the outer wall 27 and the inner wall 28. In the example represented, the intermediate wall 29, in combination with the inner wall 26, is a constituent of the first housing part section 24' and the third housing part section 24"'. The intermediate wall 29, in combination with the outer wall 27, constitutes a chamber 30, in which the dust 26 is captured and stored or retained. The chamber 30 comprises, in a spaced arrangement from both flow openings 20, 21, with radial spacing in the example represented and in the region of the second housing part section 24", an open side 31, by means of which dust 26 enters the chamber 30, but cannot leave the chamber 30. The electrical machine is orientated in use such that the dust which enters the chamber 30 is kept by gravity in the chamber.

Figure 8:
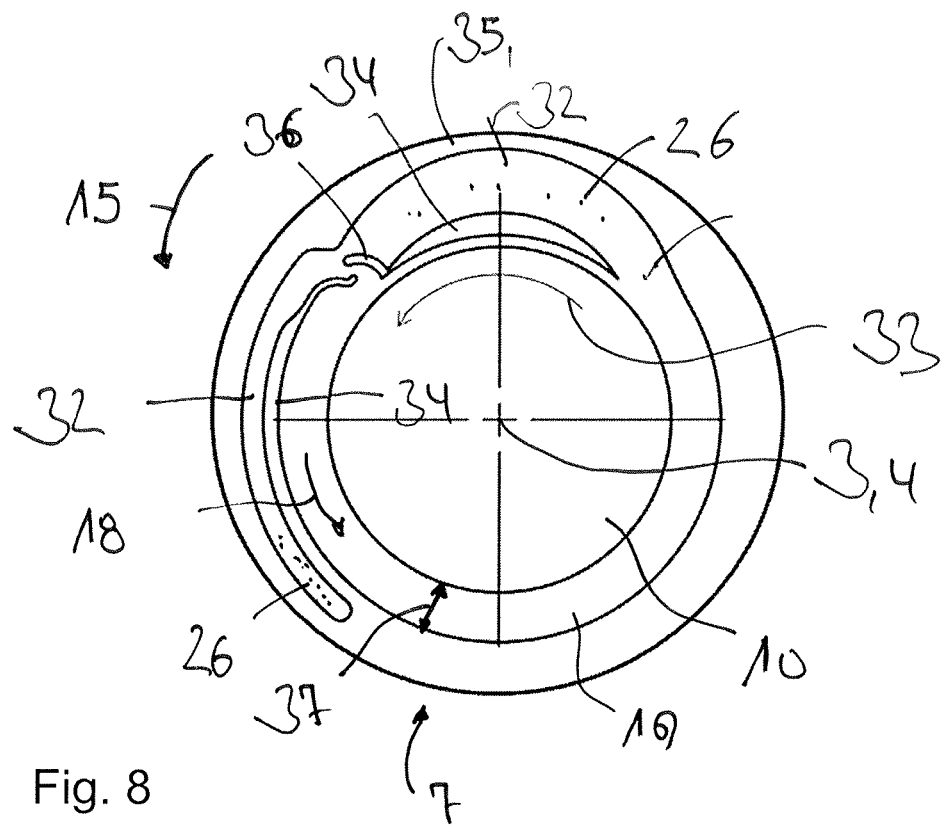
FIG. 8 shows a sectional view of the electrical machine in the region of a slip ring, in a further exemplary embodiment.
Figure 9:
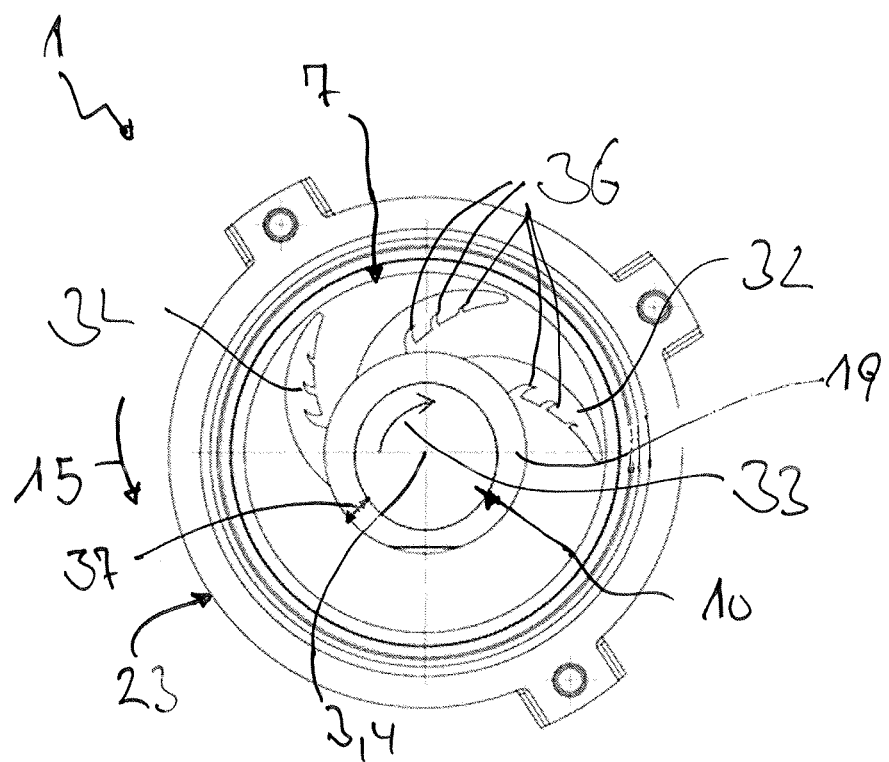
FIG. 9 shows the view from FIG. 8, in another exemplary embodiment.

FIGS. 8 and 9 respectively show different exemplary embodiments of the electrical machine 1. These exemplary embodiments each show collection spaces 32, which are cut out of the housing 7, or constituted by a cut-out. The exemplary embodiments in FIGS. 8 and 9 can be provided additionally or alternatively to the housing part 16 represented in FIGS. 1 to 7.

FIG. 8 shows a sectional view through the electrical machine 1 in the region of one of the slip rings 10. It will be seen that the housing 7, in the region of the annular gap 19 comprises at least one and, in the example represented, two collection spaces 32 which are fluidically connected to the annular gap 19. The collection spaces 32 extend along the flow path 18 and thus, in the present case, in the circumferential direction 15. It is specifically preferred if the collection spaces 32 extend along a direction of rotation 33 of the slip ring 10, and thus of the rotor 2, indicated in FIG. 8. The collection spaces 32 assume different shapes. The respective collection space 32 is delimited on one side by a dividing wall 34 of the housing 7 which delimits the annular gap 19, and on the other by a delimiting wall 35 of the housing which is radially spaced from the dividing wall 34. Similarly to the chamber 30, the respective collection space 32 serves as a volume for the collection and storage of dust 26.

In the exemplary embodiment represented in FIG. 8, the dividing wall 34 of one of the collection spaces 32 comprises a projection 36 which projects into said collection space 32, firstly for the retention of the collected and stored dust 26 in the collection space 32, and secondly to serve as an impact surface for dust 26. Moreover, in the exemplary embodiment represented in FIG. 8, the two collection spaces 32 are fluidically interconnected outside the annular gap 19, wherein the confluence of the two collection spaces 32, in the example represented, lies outside the annular gap 19.

In the exemplary embodiment represented in FIG. 9, conversely to the exemplary embodiment in FIG. 8, three collection spaces 32 are provided, each of which is identically configured and arranged with a mutual offset to one another in the circumferential direction 15. The collection spaces 32 extend in the direction of rotation 33 of the rotor 2, which is contrary to the direction of rotation 33 in the example shown in FIG. 8. A plurality of projections 36 project into the respective collection space 32. A cross-section of the respective collection space 32 tapers along the flow path 18.

Each of the collection spaces 32 preferably extends also along the axial direction 3 to increase the volume for collecting dust. It is preferred if the extension of at least one of the collection spaces 32 in axial direction 3 is at least partially in coverage with the axial extension of at least one of the slip rings 10.

In the examples shown in FIGS. 2 to 7, this pressure difference is specifically constituted between the two flow openings 20, 21.

In the examples shown in FIGS. 8 and 9, the pressure difference, alternatively or additionally, is constituted between two mutually spaced fluidic connections of the collection spaces 32 with the annular gap 19.

Collection spaces 32, as represented in FIGS. 8 and 9, can naturally also be provided in the housing part 16. It is also possible for collection spaces 32 to be provided without the housing part 16.

In the exemplary embodiments represented, the annular gap 19 is respectively designed, and is specifically configured with a radial dimension 37 to the slip rings 10 such that, during the operation of the rotor 2, by the rotation of the respective slip ring 10, a pressure difference is generated in the air in the annular gap 19 between two spaced regions in the circumferential direction, and the air is thus driven by the rotation of the slip ring 10, such that it flows along the flow path 18. In particular the annular gap 19 and a rotation speed of the rotor 2 and thus of the slip rings 10 in service are chosen to drive the air along the flow path 18 such that additional devices (not shown) for driving the air, such as a ventilator, are omitted. This is in particular achieved by designing the annular gap 19 to have a radial dimension 37 (see FIGS. 8 and 9) between 0.5 mm and 1.5 mm, more preferably between 0.9 mm and 1.1 mm, in particular 1.0 mm. Moreover the electrical machine 1 is preferably operated such that the rotation speed of the rotor 2 is at least 2500 rounds per minute (RPM) and more, more preferably 3000 RPM.

By the solution according to the invention, it is possible for the housing 7 to be configured in a closed arrangement, such that no, or at least a limited quantity of moisture or fluid can penetrate the housing 7 from the exterior. Moreover, within the housing 7, dust 26 generated collects in the housing part 16 and/or in the collection spaces 32. The propulsion of air is achieved by the rotation of the respective slip ring 10 per se, such that further separate conveyor devices for the propulsion of air in the housing 7 can be omitted.

The electrical machine 1 can thus additionally be employed in humid environments or wet environments.

The invention claimed is:

1. An electrical machine, comprising:
a stator and a rotor,
a winding for generating an electromagnetic field fitted to the rotor,
an apparatus for supplying electrical energy to the winding,
the apparatus including a slip ring that is non-rotationally mounted on the rotor, and a brush assembly that includes a brush holder and a brush fitted to the brush holder,
wherein, in operation, the brush slides against the slip ring,
a housing, in which the slip ring and the brush assembly are arranged,
wherein the housing, in a region of the slip ring, is radially spaced from the slip ring, and extends in a circumferential direction around the slip ring, such that an annular gap extending in a circumferential direction is disposed between the slip ring and the housing,
wherein the housing is fluidically substantially sealed in relation to an exterior, and a flow path of air is routed through the housing in a closed arrangement,
the housing includes a housing part arranged in a region of the annular gap,
a first flow opening and a second flow opening respectively terminate in the annular gap, and are mutually spaced from one another in the circumferential direction,
the housing part is fluidically connected to the annular gap via the first flow opening and the second flow opening, wherein a flow section of the flow path is routed through the housing part, and leads from the first flow opening to the second flow opening, and
the housing part delimits the flow section.

2. The electrical machine according to claim 1, wherein the brush assembly is accommodated in the housing part, and wherein the brush projects radially into the annular gap.

3. The electrical machine according to claim 2, wherein the brush extends in the circumferential direction between the first flow opening and the second flow opening.

4. The electrical machine according to claim 2, wherein the brush extends in the circumferential direction from the first flow opening to the second flow opening.

5. The electrical machine according to claim 2, wherein the housing part projects radially from the housing.

6. The electrical machine according to claim 1, wherein the annular gap is dimensioned such that, during operation of the rotor, rotation of the slip ring generates a pressure difference in the air between the first flow opening and the second flow opening, wherein the pressure difference drives the air along the flow path.

7. The electrical machine according to claim 6, wherein a radial dimension of the annular gap is between 0.2 mm and 2.0 mm.

8. The electrical machine according to claim 7, wherein the radial dimension of the annular gap is between 0.5 mm and 1.5 mm.

9. The electrical machine according to claim 6, wherein the electrical machine is free of separate conveyor devices for the propulsion of air in the housing.

10. The electrical machine according to claim 1, wherein the housing part includes at least two successive housing part sections arranged along the flow section and delimit the flow section, wherein the at least two successive housing part sections are inclined or transversely oriented in relation to one another such that, in a transition region between the at least two successive housing part sections, an impact wall is provided, with which air collides as the air flows through the housing part.

11. The electrical machine according to claim 1, wherein:
the housing part includes an outer wall and an inner wall that are arranged in mutual opposition to one another and delimit the flow section, and
an intermediate wall is arranged between the outer wall and the inner wall, the intermediate wall in combination with the outer wall defining a chamber that is open on a side averted from at least one of the first flow openings and the second flow opening.

12. The electrical machine according to claim 1, wherein the housing part projects radially from the housing.

13. The electrical machine according to claim 1, wherein the housing part symmetrically delimits the flow section with respect to a plane that extends radially through the housing part.

14. The electrical machine according to claim 1, wherein:
the housing comprises at least one collection space that is cut out of the housing, and is fluidically connected to the annular gap, and
the at least one collection space extends along the flow path in a region of the at least one collection space, and with a clearance to the flow path.

15. The electrical machine according to claim 14, wherein the housing includes at least one projection that projects into the at least one collection space.

16. The electrical machine according to claim 14, wherein the at least one collection space has a cross-section that varies along the flow path.

17. The electrical machine according to claim 14, wherein the at least one collection space includes at least two collection spaces provided in sequence along the flow path.

18. The electrical machine according to claim 17, wherein the at least two collection spaces are fluidically connected to one another outside the annular gap.

19. The electrical machine according to claim 17, wherein the housing includes at least two projections that respectively project into an associated one of the at least two collection spaces.

20. An electric machine, comprising:
- a stator and a rotor,
- a winding for generating an electromagnetic field fitted to the rotor,
- a supply apparatus providing electrical energy to the winding,
- the supply apparatus including a slip ring that is non-rotationally mounted on the rotor, and a brush assembly that includes a brush holder and a brush fitted to the brush holder, wherein, in operation, the brush slides against the slip ring,
- a housing, in which the slip ring and the brush assembly are arranged,
- wherein the housing, in a region of the slip ring, is radially spaced from the slip ring, and extends in a circumferential direction around the slip ring, such that an annular gap extending in a circumferential direction is disposed between the slip ring and the housing,
- wherein the housing is fluidically substantially sealed in relation to an exterior, and a flow path of air is routed through the housing in a closed arrangement,
- the housing includes a housing part arranged in a region of the annular gap,
- a first flow opening and a second flow opening respectively terminate in the annular gap, and are mutually spaced from one another in the circumferential direction,
- the housing part is fluidically connected to the annular gap via the first flow opening and the second flow opening,
- wherein a flow section of the flow path is routed through the housing part, and leads from the first flow opening to the second flow opening,
- wherein the housing part delimits the flow section, and
- wherein the brush projects radially into the annular gap.

* * * * *